(12) United States Patent
Hamada et al.

(10) Patent No.: US 6,915,023 B2
(45) Date of Patent: Jul. 5, 2005

(54) CONTOUR CORRECTION DEVICE

(75) Inventors: Shohichi Hamada, Yaita (JP); Haruki Ishimochi, Nikko (JP)

(73) Assignee: Sharp Kabushiki Kaisha, Osaka (JP)

( * ) Notice: Subject to any disclaimer, the term of this patent is extended or adjusted under 35 U.S.C. 154(b) by 587 days.

(21) Appl. No.: 10/148,424

(22) PCT Filed: Nov. 29, 2000

(86) PCT No.: PCT/JP00/08428

§ 371 (c)(1),
(2), (4) Date: May 30, 2002

(87) PCT Pub. No.: WO01/41425

PCT Pub. Date: Jul. 6, 2001

(65) Prior Publication Data
US 2002/0181800 A1 Dec. 5, 2002

(30) Foreign Application Priority Data
Nov. 30, 1999 (JP) .......................................... 11-339015

(51) Int. Cl.[7] ................................................ G06K 9/40
(52) U.S. Cl. ........................ 382/266; 382/264; 382/272; 382/274
(58) Field of Search ................................ 382/254–275; 358/518, 520, 426.01–426.16; 345/611–616

(56) References Cited

U.S. PATENT DOCUMENTS

| 5,081,692 A | * | 1/1992 | Kwon et al. ................. 382/263 |
| 5,124,787 A | | 6/1992 | Lee et al. |
| 5,420,633 A | | 5/1995 | Matoba |
| 5,953,461 A | * | 9/1999 | Yamada ....................... 382/266 |
| 6,289,136 B1 | * | 9/2001 | Oshino et al. ............... 382/298 |

FOREIGN PATENT DOCUMENTS

| EP | 0 784 399 A1 | 7/1997 |
| JP | 3-26070 A | 2/1991 |
| JP | 3-263977 A | 11/1991 |
| JP | 4-42668 A | 2/1992 |
| JP | 4-342375 A | 11/1992 |
| JP | 5-91532 A | 4/1993 |
| JP | 6-326892 A | 11/1994 |
| JP | 7-7636 A | 1/1995 |
| JP | 7-336717 A | 12/1995 |
| JP | 8-163408 A | 6/1996 |
| JP | 9-154044 A | 6/1997 |
| JP | 11-32236 A | 2/1999 |
| JP | 11-355613 A | 12/1999 |

OTHER PUBLICATIONS

Supplementary European Search Report mailed Mar. 1, 2004 in corresponding EP application 00979016.3–2202–JP0008428.
International Preliminary Examination Report mailed Sep. 4, 2002.
Hungarian Search Report mailed Apr. 14, 2003 in corresponding Hungarian Application No. P0204070.

* cited by examiner

Primary Examiner—Bhavesh M. Mehta
Assistant Examiner—Sath V Perungavoor
(74) Attorney, Agent, or Firm—Nixon & Vanderhye, P.C.

(57) ABSTRACT

Filtration of an input signal implemented in the horizontal or vertical direction may disorder the gradation in oblique directions, so that oblique lines may become jagged. To deal with this situation, the following components are provided to process the input signal: a waveform correcting means (6) having a correcting characteristic that the slope for correction in the medium-luminance range is greater than that in the high-luminance range or in the low-luminance range; a processing means (7) for extracting the deviation of the input signal processed by the waveform correcting means; a picture edge strength detecting means (1); and a processing means (8) for performing operations based on the deviation of the input signal and the picture edge strength.

8 Claims, 5 Drawing Sheets

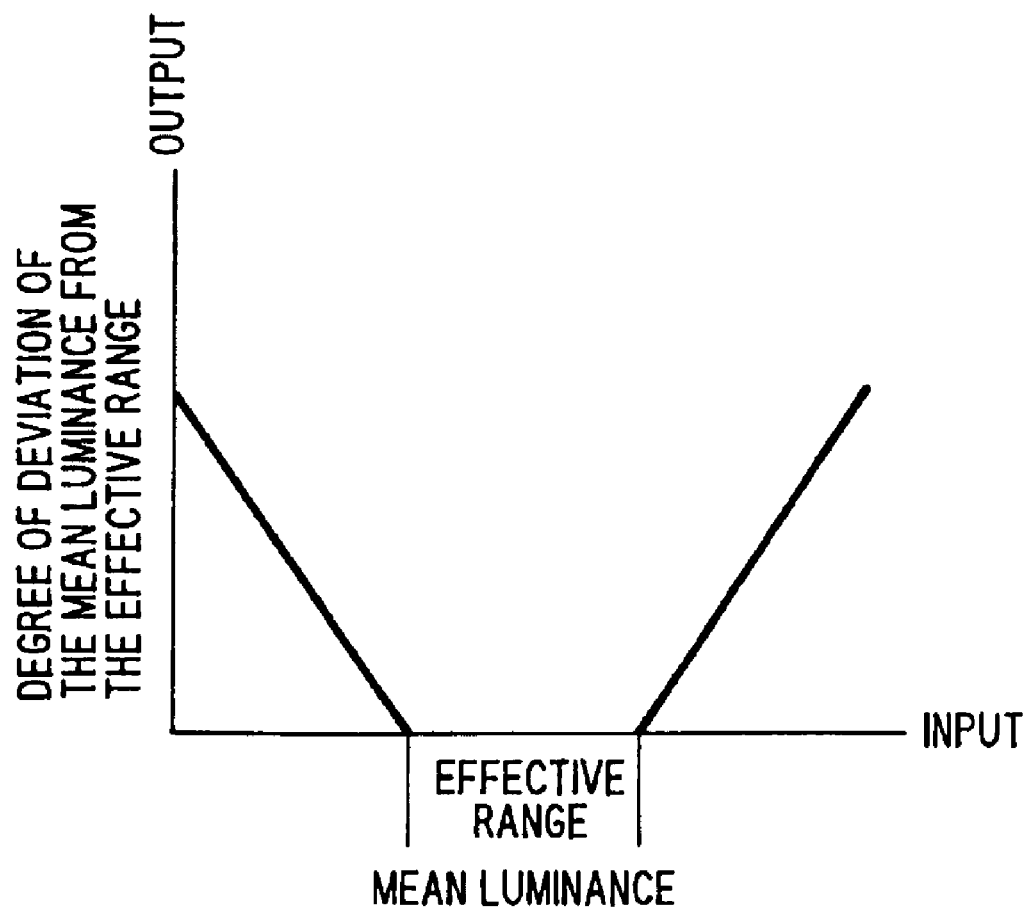

CONTOUR CORRECTION DEVICE

This application is the U.S. national phase of international application PCT/JP00/08428 filed 29 Nov. 2000, which designated the U.S.

TECHNICAL FIELD

The present invention relates to an image contour correcting device.

BACKGROUND ART

In the visual apparatus field, in order to improve image sharpness, contour correction circuits for correcting video signals have been used so as to emphasize contours of the picture signals.

Conventionally used contour correction circuits generate a contour correction signal from high-frequency components which may be extracted from an input video signal, by passing it through a high-pass filter, by a differentiation process or the like, and superimpose the extracted contour correction signal over the delayed input video signal by an adder, to thereby produce a video signal enhanced in sharpness at contours.

However, since the above usually used, conventional contour correction method performs contour correction by emphasizing the supplied reproduction luminance signal over the range from low-luminance to high-luminance in the same manner, in some cases noise existing at areas where the luminance signal is low may also be enhanced; in other cases while excessive overshoots or undershoots of large amplitudes may occur around rising edges at which the luminance signal sharply rises from black to white levels or around falling edges at which the luminance signal sharply drops from white to black levels, whereby boundaries between black and white areas are unnaturally emphasized producing contour blurs or noise is also emphasized at the same time, resulting in degradation of image quality.

In order to solve the above problems, a method has been disclosed in Japanese Patent Application Laid-open Hei 7 No. 7636.

The system disclosed in Japanese Patent Application Laid-open Hei 7 No. 7636 includes a correcting means for performing contour correction of emphasizing the levels of all the tones of the luminance signal in like manner; a halftone emphasizing means for emphasizing only the levels corresponding to halftones of the luminance signal; and a multiplying means for multiplying the luminance signal, which has been contour corrected by, and is output from, the correcting means, by the halftone emphasized signal, or the signal which has been emphasized as to the levels corresponding halftones only and is output from the halftone emphasizing means, and is characterized in that only the contours with their luminance signal belonging to medium levels are corrected.

Since this method emphasizes the medium tone levels only, without emphasizing noises that exist in the areas where the luminance signal level is low, it is possible to obtain high quality images free from conspicuous noises. Further, since no level emphasis will be achieved for rising edges at which the luminance signal sharply changes from black to white levels or for falling edges at which the luminance signal sharply drops from white to black levels, no excessive overshoots or undershoots of large amplitudes will occur. As a result, contours at the boundaries between black and white areas will be never emphasized unnaturally, so this method can be thought as an invention which is able to make such boundary areas markedly clear.

However, this method uses filtration along the horizontal or vertical direction, hence suffers from the problem of oblique lines becoming jagged because the filtration disrupts the gradation of oblique lines etc., in oblique directions.

In view of the above problems, the present invention is to provide a contour correcting device free from the above problems.

DISCLOSURE OF INVENTION

In order to solve the above problems, the present invention is configured as follows.

First, a contour correcting device of the present invention includes: an edge extractor for calculating the strength of a contour in a picture signal; a mean luminance calculator for calculating a mean luminance level in a specified area in the picture signal and calculating the deviation of the mean luminance level from a predetermined luminance level; a first processor for controlling the output from the edge extractor based on the output from the mean luminance calculator; a waveform corrector which divides the picture signal into a plurality of luminance level ranges and controls a luminance level characteristic for each of the classified ranges; a second processor for calculating the variation of the output from the waveform corrector from the picture signal; and a third processor for generating a contour correcting signal by multiplying the output from the first processor by the output from the second processor.

Also a contour correcting device may comprise: an edge extractor for calculating the strength of contours in a picture signal; a mean luminance calculator for calculating the mean luminance level in a specified area in the picture signal and calculating the deviation of the mean luminance level from a predetermined luminance level; a first processor for controlling the output from the edge extractor based on the output from the mean luminance calculator; a filter for extracting the signal component of a predetermined frequency range from the output from the first processor; a waveform corrector which divides the picture signal into a plurality of luminance level ranges and controls the luminance level characteristic for each of the classified ranges; a second processor for calculating the variation of the output from the waveform corrector from the picture signal; and a third processor for generating a contour correcting signal by multiplying the output from the filter by the output from the second processor.

Here, it is preferred that the waveform corrector divides the picture signal into high-luminance level, medium-luminance level and low-luminance level ranges, and the ratio of an input signal to an output signal in the medium-luminance level range is set greater than the ratio of an input signal to an output signal in the high-luminance level range and/or in the low-luminance level range.

Alternatively, it is also possible to provide a configuration such that the waveform corrector divides the picture signal into high-luminance level, medium-luminance level and low-luminance level ranges, and the ratio of an input signal to an output signal in the high-luminance level range and/or in the low-luminance level range is set smaller than the ratio of an input signal to an output signal in the medium-luminance level range.

Further, the input and output characteristic may have an approximate S shape.

The filter is preferably a low-pass filter.

BRIEF DESCRIPTION OF DRAWINGS

FIG. 7 shows an input/output characteristic of a second coring process of a contour correcting device according to an embodiment of the present invention.

BEST MODE FOR CARRYING OUT THE INVENTION

The embodiments of the present invention will be described with reference to FIGS. 1 through 7.

Figure 1:
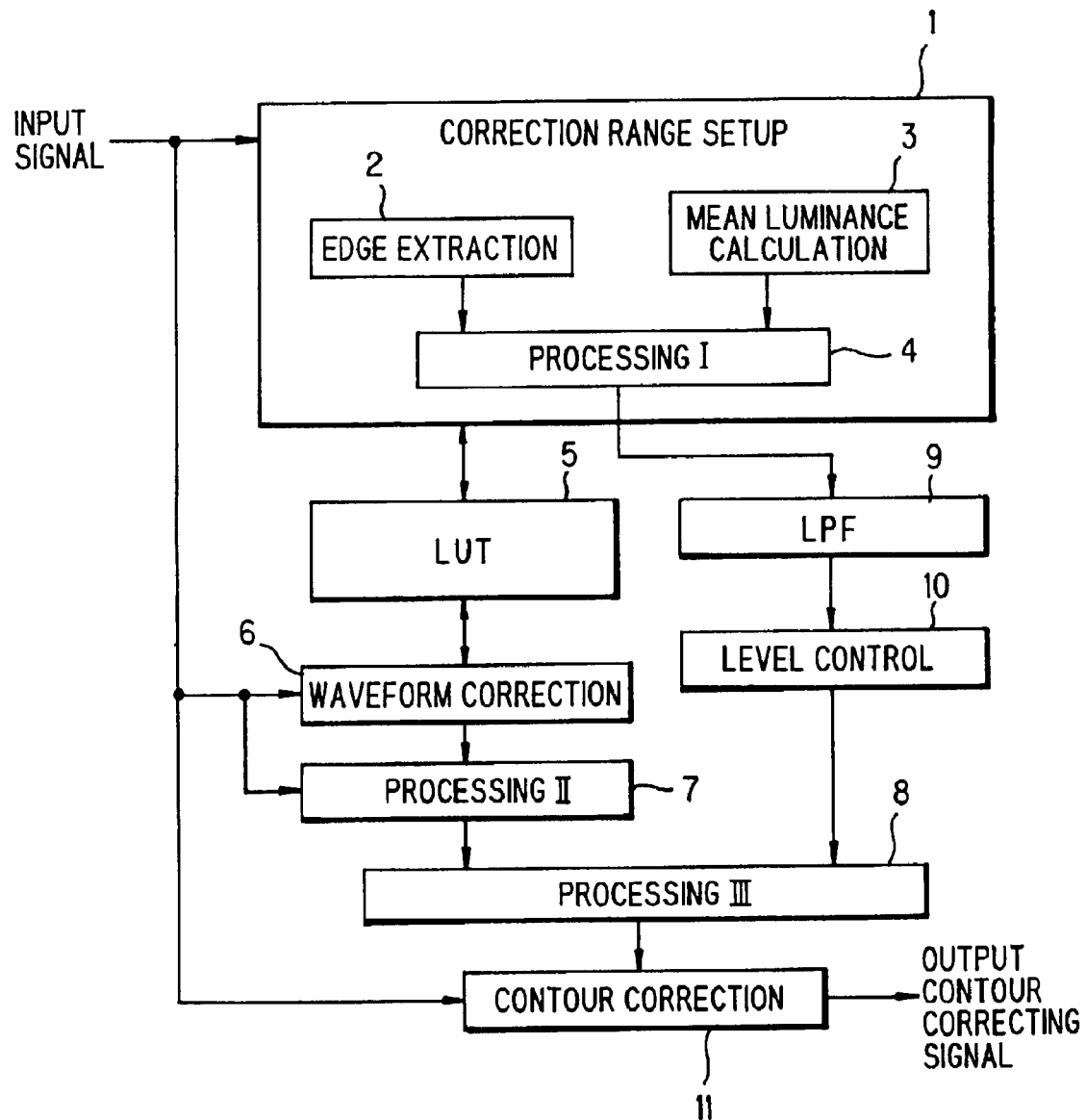
FIG. 1 is a block diagram showing the concept of a contour correcting device according to an embodiment of the present invention.

FIG. 1 is a block diagram showing the concept of a contour correcting device according to an embodiment of the present invention.

In FIG. 1, 1 designates a correction range setting portion for determining areas and ranges in which contour correction is to be done. This correction range setting portion 1 is comprised of an edge extractor 2, a mean luminance calculator 3 for detecting the mean luminance of a designated area and a first processor 4 that receives the outputs from the edge extractor 2 and mean luminance calculator 3 and performs predetermined operations.

Figure 3:
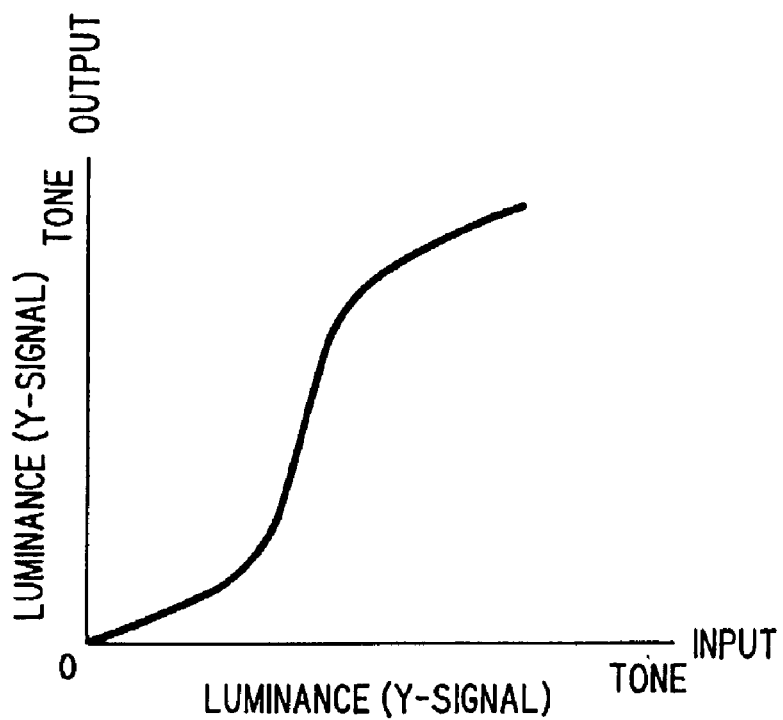
FIG. 3 shows an input/output characteristic as to waveform correction of a contour correcting device according to an embodiment of the present invention.
Figure 5:
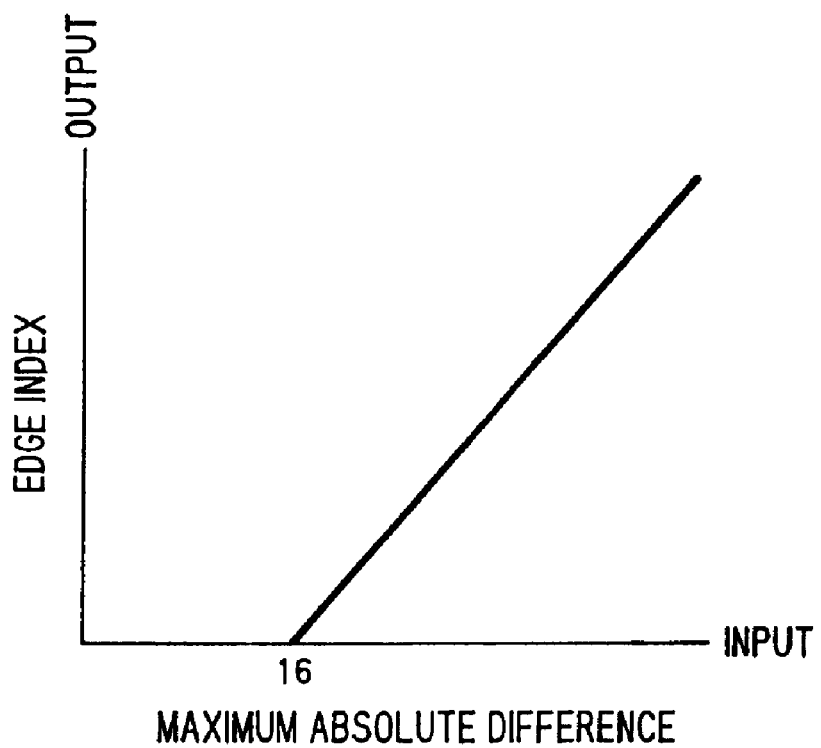
FIG. 5 shows an input/output characteristic of the first coring process of a contour correcting device according to an embodiment of the present invention.

Designated at 5 is a look-up table (which will be referred to hereinbelow as LUT) in which conversion characteristics, various threshold values are stored. FIGS. 3, 5 and 7 show the example of input/output characteristics. Reference numeral 6 designates a waveform corrector which converts the input signal in accordance with the conversion characteristics given by LUT 5 and outputs the converted input signal and 7 designates a second processor which extracts components to be corrected, based on the operation between the input signal and the converted waveform.

Further, 9 designates a low-pass filter (which will be referred to hereinbelow as LPF), 10 designates a level adjuster, 8 designates a third processor which extracts the amounts of contour correction in the area determined by correction range setting portion 1, and 11 designates a contour corrector for implementing contour correction to the input signal.

Figure 2:
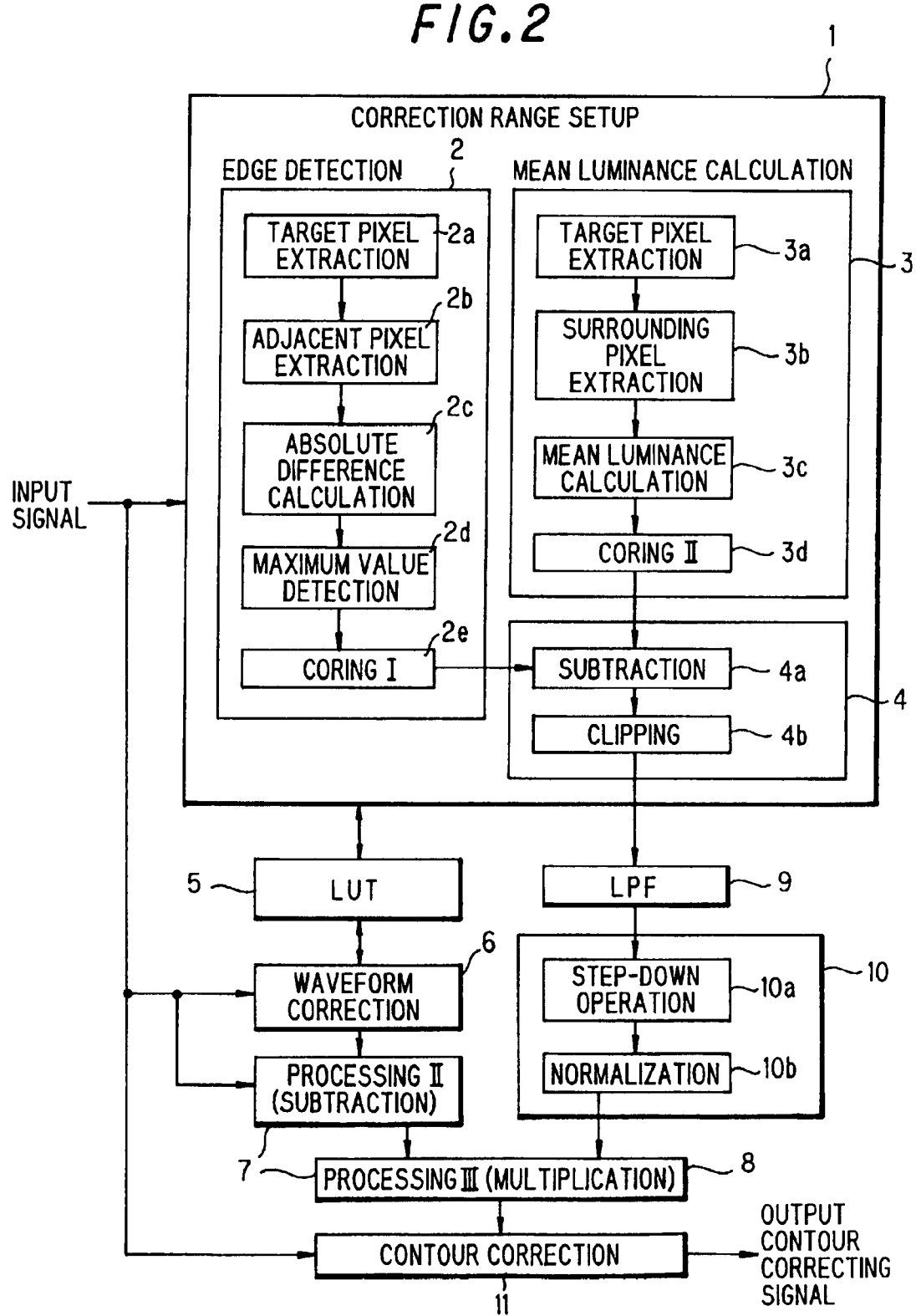
FIG. 2 is a detailed, block diagram showing a contour correcting device according to an embodiment of the present invention.

FIG. 2 is a block diagram showing in detail each constituent of the above block diagram.

In FIG. 2, edge detector 2 is comprised of a target pixel extracting portion 2a for edge extraction, an adjacent pixel extracting portion 2b, an absolute difference calculator 2c for calculating the absolute difference between the target pixel and each adjacent pixel, a maximum absolute difference detecting portion 2d and a first coring portion 2e.

The mean luminance calculator 3 is comprised of a target pixel extracting portion 3a for calculating the average of the luminance of a specified area, an adjacent pixel extracting portion 3b, a mean luminance calculating portion 3c and a second coring portion 3d.

Further, the first processor 4 is composed of a subtracter 4a and a clipping portion 4b. The level adjuster 10 is comprised of a step-down processor 10a and a normalizer 10b.

Next, the operation will be described with reference to FIG. 2.

The main feature of the present invention is that waveform correction is performed in such a manner that the slope in the medium luminance range is set greater for the pattern edges of the pictures while the slopes in the high-luminance and low-luminance ranges are set smaller, whereby the edges will be depicted with more vividness while flat fields are reproduced directly as natural pictures. To achieve this, the method includes three steps: the first step for extracting the variation from the original input signal to the signal which has been uniformly converted therefrom based on the conversion characteristic stored in LUT 5; the second step for determining correction areas; and the third step for determining the amount of correction and implementing contour correction.

First, in the first step, the input picture signal is supplied to waveform corrector 6 and second processor 7. In the waveform corrector 6, the input picture signal is corrected based on the characteristic stored in LUT 5 as shown in FIG. 3, or based on the approximate S-shaped conversion characteristic in which the slope of the medium-luminance (i.e., input/output signal ratio) is set equal to or greater than 45 degrees while the slopes in the high-luminance and the low-luminance ranges are set smaller. (It is also possible that the slopes in the high-luminance and the low-luminance ranges are set smaller while the slope in the medium-luminance is fixed as is. Alternatively, the slope in the medium-luminance may be made steeper while the slopes in the high-luminance and the low-luminance ranges may be set as they are). In FIG. 3 both the horizontal and vertical axes represent luminance values (Y-signals), for example, ranging from 0 to 255, for input and output when the luminance signal has 8 bit tones.

The input picture signal, which has been corrected through the waveform corrector 6, is processed through second processor 7 so as to calculate its difference from the input, original picture signal. By this operation, the variation from the original picture signal to the picture signal after correction can be extracted in second processor 7.

Next, at the second step, edges as well as their edge strength are detected. This is done in the following manner.

The picture signal is input to the edge detector 2 and mean luminance calculator 3.

Figure 4:
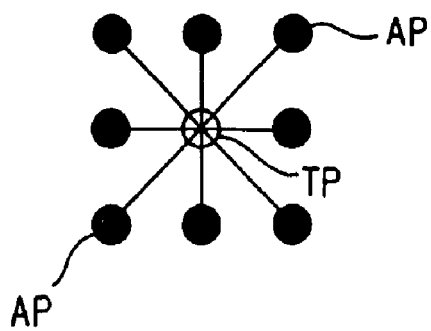
FIG. 4 shows an edge detection pattern of a contour correcting device according to an embodiment of the present invention.

First, the picture signal is input to the edge detector 2 where a target pixel TP is extracted from the signal by target pixel extracting portion 2a. Then, adjacent pixels AP, left and right, above and below, and diagonally located with respect to the target pixel PT are extracted by adjacent pixel extracting portion 2b. FIG. 4 shows the relationship between the target pixel TP and adjacent pixels AP. In FIG. 4, the blank circle represents target pixel TP and the solid circles represent its adjacent pixels AP.

Next, in absolute difference calculating portion 2c, the absolute differences in tonal level between the extracted target pixel TP and each of the eight adjacent pixels AP are calculated. Then, at maximum value detector 2d, the maximum value of the absolute differences as to tonal level is determined.

Further, in first coring processor 2e, signals of low levels among the maximum values extracted through maximum value detector 2d are regarded as having been detected erroneously due to noise and removed to implement a coring process. The characteristic of this first coring process should be stored in LUT 5 and it preferably has the feature shown in FIG. 5, for example. That is, this coring process preferably has the characteristic that the output value remains "0" up to a predetermined input level and increases from that point as the input value increases.

The output from the first coring processor 2e will function as an index that represents the edge strength of the target pixel. Accordingly, an area where this value is "0" is regarded as a flat field.

The picture signal is also supplied to mean luminance calculator 3 (FIG. 2), as stated above. Because the above conversion characteristic shown in FIG. 3 is effective to correct the medium luminance levels only, if the mean luminance around a target pixel TP is too low or too high there is a risk that the area might be darkened too far or whitened too far, or reversely emphasized. To avoid this situation, an effective range for the mean luminance is preset so that correction cannot be made to other than this range. In this case, it is preferred that this effective range approximately coincides with the medium luminance range shown in FIG. 3.

Figure 6:
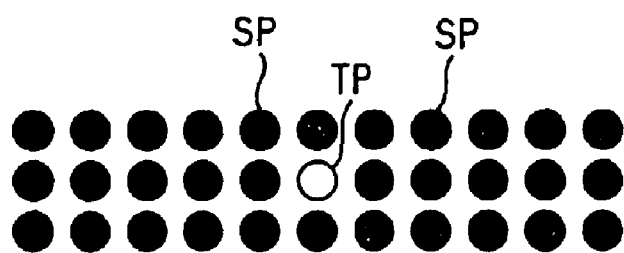
FIG. 6 shows a surrounding pixel pattern at a mean luminance calculator according to a contour correcting device of an embodiment of the present invention.

The picture signal is supplied to mean luminance calculating unit 3, where a target pixel TP is extracted at target pixel extracting portion 3a and then surrounding pixels around the target pixel TP are extracted by surrounding pixel extracting portion 3b. FIG. 6 shows the relationship between the target pixel TP and surrounding pixels SP. In FIG. 6, the blank circle represents target pixel TP and the solid circles represent its surrounding pixels SP. For example, for each target pixel TP at the center, thirty-two surrounding pixels SP may be selected in the 11×3 pixels (11 horizontal pixels×3 lines of pixels) that surround the target pixel.

Next, in mean luminance calculating portion 3c, the average of the 32 luminance values of the surrounding pixels SP is calculated.

Further, in the second coring processor 3d, the mean luminance value, calculated in mean luminance calculating portion 3c, is converted based on a predetermined conversion characteristic. This predetermined conversion characteristic is stored in LUT 5. For example, this coring process preferably has the characteristic shown in FIG. 7 that the output value remains "0" across a certain effective input range and gradually increases as the level of input becomes away from the designated range.

The above characteristic of the second coring process represents the degree of deviation from the correction effective range, determined based on the mean luminance.

Next, the value of the edge strength thus determined at edge detector 2 as well as the degree of deviation of the mean luminance, determined through mean luminance calculating portion 3, from the effective range is input to the first calculating portion 4 (FIG. 2).

In this first processor 4, subtraction of the edge strength value and the degree of deviation of the mean luminance from the effective range is performed in subtracter 4a and then the data is subjected to a clipping treatment in clipping portion 4b where the data is regulated based of a fixed value. For example, in the case shown in FIG. 5, the output (edge index) is set to be zero when the input ranges from 0 to 16.

In this way, by providing gradually varying intermediate ranges (sloped portion or portions in FIGS. 5 and 7) with respect to certain thresholds (e.g., the intersection or intersections with the horizontal axis of the graph), it is possible to obtain stable video images even including data spreading across the threshold. That is, if the input value exceeds the threshold level, the output value will not transit to the maximum at a burst but increases gradually. Therefore, it is possible to prevent fluctuations.

Finally, at the third step, the amount of correction is determined and the correction is implemented.

The output from the clipping portion 4b is supplied to LPF 9 (FIG. 2). This gradates the boundaries between edges and flat fields. Specifically, since the values calculated at the correction range setting portion are calculated for every pixel, one pixel of two adjacent pixels, left and right, may have a maximum level (e.g., 16) and the other may have a minimum level (0). In this case, the former pixel of the adjacent pixels is corrected maximally while the latter is uncorrected. As a result, a sharp variation would occur in the image at the boundary between the corrected and uncorrected area, failing to produce a natural image. To avoid this, passing the data from the correction range setting portion through the LPF makes it possible to gradate the area where there is a step between left and right pixels. For example, a series of six pixels having data of '0, 0, 0, 16, 16, 16' can be gradated into data of '0, 0, 4, 12, 16, 16' so as to reduce the sharp variation. In sum, the LPF will smoothen the data in the horizontal direction.

The signal having passed through LPF 9 is supplied as the data representing the correction efficiency to level adjuster 10 (FIG. 2).

The signal supplied to the level adjuster 10 is stepped down uniformly by step-down processor 10a and then the input signal is normalized to 0 to 1 by the normalizer 10b.

Third processor 8 multiplies the variation determined at the step 1 and the normalized output from level adjuster 10.

At contour corrector 11, the correcting component, i.e., the output from the third processor 8, is added to the input picture signal, whereby a contour corrected output signal is obtained.

As described heretofore, since the contour emphasis based on the waveform correction according to the present invention is implemented using the emphasis component calculated from the absolute level of luminance, instead of that obtained from the variations of luminance in the horizontal and vertical directions, it is possible to reproduce video images markedly stable and consistent without disordering the gradations of oblique lines etc.

It is also possible to smoothen the patterns around edges by gradating the boundaries between the corrected edges and the non-corrected areas.

Moreover, though the conversion characteristic and coring characteristics were assumed to be fixed in the description of the above embodiment, the conversion characteristic and the effective ranges of the coring characteristics may be dynamically changed in accordance with the luminance distribution across the whole frame of image.

Here it should be added that the above-described blocks and processing flow of the present invention can be obviously realized also by a software configuration, instead of a hardware configuration.

Additionally, for RGB input, the same process can be effected on the luminance signal which can be generated by the appropriate matrix process.

According to the present invention, since the waveform correcting means having a correction characteristic, such as approximately S-shaped characteristic, that the correction slope for the medium luminance range is set greater than that for the high-luminance and/or low-luminance range is used to implement waveform correction, it is possible to transform data of a gentle rise into data of a steep rise without causing any overshoot or undershoot. Therefore, it is possible to improve the apparent contrast and implement the correction at edges only, whereby the edges can be depicted with more vividness while flat fields are reproduced directly so as to produce a natural picture with its gradational representation retained.

Since the variation extracted by the variation extracting means, differing from the variational component extracted through a high-pass filter which has been typically used, is extracted based on the luminance of each pixel, this configuration has strong resistance to noise and makes it possible to reproduce even oblique lines without degrading their gradations.

Further, since the average of the luminance values in a predetermined area is also used as the condition for determining whether or not correction is to be made, it is possible to suppress degradation of particular areas being darkened too far or whitened too far.

Use of a low-pass filter to allow the edge strength value and/or the output value from the first processor to pass therethrough makes it possible to gradate the boundaries between edges and flat fields in the image, hence it is possible to obtain images with acceptable contour reproduction.

Further, since edge detection of the edge detecting means is carried out based on the maximum value in absolute difference with the surrounding pixels, this as well makes detection of oblique edges easy, hence it is possible to make appropriate correction to contours of oblique lines and the like.

INDUSTRIAL APPLICABILITY

As has been described heretofore, the contour correcting device according to the present invention is suitably applied to general visual apparatuses which reproduce natural pictures on the display by improving the apparent contrast of the picked up video signal while enhancing vividness at pattern edges.

What is claimed is:

1. A contour correcting device comprising:
   an edge extractor for calculating the strength of a contour in a picture signal;
   a mean luminance calculator for calculating a mean luminance level in a specified area in the picture signal and calculating a deviation of the mean luminance level from a predetermined luminance level;
   a first processor for controlling an output from the edge extractor based on an output from the mean luminance calculator;
   a waveform corrector which divides the picture signal into a plurality of luminance level ranges and controls a luminance level characteristic for each of the classified ranges;
   a second processor for calculating a variation of an output from the waveform corrector from the picture signal; and
   a third processor for generating a contour correcting signal by multiplying an output from the first processor by an output from the second processor.

2. A contour correcting device comprising:
   an edge extractor for calculating the strength of a contour in a picture signal;
   a mean luminance calculator for calculating a mean luminance level in a specified area in the picture signal and calculating a deviation of the mean luminance level from a predetermined luminance level;
   a first processor for controlling an output from the edge extractor based on an output from the mean luminance calculator;
   a filter for extracting a signal component of a predetermined frequency range from an output from the first processor;
   a waveform corrector which divides the picture signal into a plurality of luminance level ranges and controls a luminance level characteristic for each of the classified ranges;
   a second processor for calculating a variation of an output from the waveform corrector from the picture signal; and
   a third processor for generating a contour correcting signal by multiplying an output from the filter by and output from the second processor.

3. The contour correcting device according to claim 1, wherein the waveform corrector divides the picture signal into high-luminance level, medium-luminance level and low-luminance level ranges, and a ratio of an input signal to an output signal in the medium-luminance level range is set greater than a ratio of an input signal to an output signal in the high-luminance level range or in the low-luminance level range.

4. The contour correcting device according to claim 2, wherein the waveform corrector divides the picture signal into high-luminance level, medium-luminance level and low-luminance level ranges, and a ratio of an input signal to an output signal in the medium-luminance level range is set greater than a ratio of an input signal to an output signal in the high-luminance level range or in the low-luminance level range.

5. The contour correcting device according to claim 1, wherein the waveform corrector divides the picture signal into high-luminance level, medium-luminance level and low-luminance level ranges, and a ratio of an input signal to an output signal in the high-luminance level range or in the low-luminance level range is set smaller than a ratio of an input signal to an output signal in the medium-luminance level range.

6. The contour correcting device according to claim 2, wherein the waveform corrector divides the picture signal into high-luminance level, medium-luminance level and low-luminance level ranges, and a ratio of an input signal to an output signal in the high-luminance level range or in the low-luminance level range is set smaller than a ratio of an input signal to an output signal in the medium-luminance level range.

7. The contour correcting device according to claim 1, wherein the waveform corrector has an input and output characteristic of an approximate S shape.

8. The contour correcting device according to claim 2, wherein the filter is a low-pass filter.

* * * * *